(12) United States Patent
Borg et al.

(10) Patent No.: US 9,905,066 B2
(45) Date of Patent: Feb. 27, 2018

(54) KEY DEVICE AND ASSOCIATED METHOD, COMPUTER PROGRAM AND COMPUTER PROGRAM PRODUCT

(71) Applicant: ASSA ABLOY AB, Stockholm (SE)

(72) Inventors: Anders Borg, Vallentuna (SE); Mats Cederblad, Haesselby (SE); Daniel Garmen, Bromma (SE); Tomas Jonsson, Roenninge (SE); Peter Siklosi, Taeby (SE)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 15/644,606

(22) Filed: Jul. 7, 2017

(65) Prior Publication Data

US 2017/0309099 A1    Oct. 26, 2017

Related U.S. Application Data

(63) Continuation of application No. 15/414,041, filed on Jan. 24, 2017, now Pat. No. 9,704,321, which is a continuation of application No. 14/901,802, filed as application No. PCT/EP2014/064178 on Jul. 3, 2014, now Pat. No. 9,589,406.

(30) Foreign Application Priority Data

Jul. 5, 2013    (EP) .................................... 13175355

(51) Int. Cl.
G07C 9/00    (2006.01)
H04L 9/32    (2006.01)

(52) U.S. Cl.
CPC ........ *G07C 9/00309* (2013.01); *H04L 9/3271* (2013.01); *G07C 2009/00769* (2013.01)

(58) Field of Classification Search
CPC ............ G07C 2209/08; G07C 9/00309; G07C 9/00103; G07C 9/00571; G07C 9/00896; G07C 2009/00793; G07C 9/00817; G07C 9/00912
USPC ........................................................ 340/5.61
See application file for complete search history.

(56) References Cited

U.S. PATENT DOCUMENTS 6,384,711 B1 *   5/2002   Cregger .............   G07C 9/00103
                                                        340/5.65

OTHER PUBLICATIONS

Official Action for Australia Patent Application No. 2014286137, dated Aug. 2, 2017, 4 pages.

(Continued)

*Primary Examiner* — Mark Blouin
(74) *Attorney, Agent, or Firm* — Sheridan Ross P.C.

(57) ABSTRACT

It is presented a key device comprising: a mechanical interface for mechanically maneuvering a lock device upon successful access control. The mechanical interface comprises a connector for powering the lock device and for communication with the lock device such that the lock device is able to perform electronic access control using the key device. The key device further comprises a clock; a memory; a radio communication module; and a controller arranged to, using the radio communication module communicate online with an access control device and use the memory as temporary storage for offline communication between the access control device and one or more lock devices. A corresponding method, computer program and computer program product are also presented.

31 Claims, 4 Drawing Sheets

(56) References Cited

OTHER PUBLICATIONS

Official Action with English Translation for China Patent Application No. 201480038149.7, dated Sep. 8, 2017, 10 pages.
Notice of Allowance for U.S. Appl. No. 15/413,046, dated Sep. 6, 2017 7 pages.
Official Action with English Translation for China Patent Application No. 201480037722.2, dated Sep. 29, 2017, 10 pages.
Official Action with English Translation for Chile Patent Application No. 201503670, dated Oct. 19, 2017, 10 pages.

* cited by examiner

KEY DEVICE AND ASSOCIATED METHOD, COMPUTER PROGRAM AND COMPUTER PROGRAM PRODUCT

CROSS-REFERENCE TO RELATED APPLICATIONS

This application is a continuation of U.S. patent application Ser. No. 15/414,041, filed Jan. 24, 2017, which is a continuation of U.S. patent application Ser. No. 14/901,802, filed Dec. 29, 2015, now U.S. Pat. No. 9,589,406, which is a national stage application under 35 U.S.C. 371 and claims the benefit of PCT Application No. PCT/EP2014/064178 having an international filing date of Jul. 3, 2014, which designated the United States, which PCT application claimed the benefit of European Patent Application No. 13175355.0 filed Jul. 5, 2013, the disclosures of each of which are incorporated herein by reference.

TECHNICAL FIELD

The invention relates to a key device, associated method, computer program and computer program product for facilitating communication between a key device and a access control device.

BACKGROUND

Access control systems based on electronic access are provided today using a variety of different topologies. One such solution is when electronic lock to devices are installed without a power supply. The lock devices may then be powered when a matching key device is inserted, using an electrical connection with the key device.

An issue exists in how lock devices and/or key devices are provided with up-to-date access rights. For example, if a person loses a key device, it should be easy and reliable for an operator of the access control system to bar the lost key device from gaining access to any lock devices of the access control system.

US 2007/296545 A1 discloses a lock system having a remote actuating key device, e.g., a portable member arranged to wirelessly transmit a wireless signal, and a passive lock device for receiving that signal.

WO 93/14571 A1 discloses a secure entry system making use of radio transmissions to communicate with locks, keys, and related components throughout the system.

U.S. Pat. No. 5,475,375 A discloses an access control system providing a database in an access control device (i.e. key) and includes procedures assuring that the database, and a master database, are kept up to date.

In the prior art, the key devices are updated using dedicated key update devices. While this can provide updated access rights to the key devices for provision to the lock devices, the key update devices are large and cumbersome, whereby the keys are not updated very often. This leads to compromised security since a significant amount of time can flow from an operator updating an access rights and the updated access rights being propagated to all key devices and lock devices.

SUMMARY

It is an object to provide a more convenient way to provide communication between an access control device and a lock device.

According to a first aspect, it is presented a key device comprising: a to mechanical interface for mechanically maneuvering a lock device upon successful access control. The mechanical interface comprises a connector for powering the lock device and for communication with the lock device such that the lock device is able to perform electronic access control using the key device. The key device further comprises a clock; a memory; a radio communication module; and a controller arranged to, using the radio communication module communicate online with an access control device and use the memory as temporary storage for offline communication between the access control device and one or more lock devices. By including the radio communication module, convenient communication with the access control device is achieved, thereby providing communication between the lock device and the access control device, even when the lock device has no other means of communicating than with a key device. The mechanical interface can e.g. be a blade, similar to a traditional key, whereby the blade may (but does not need to) be provided with a mechanical code, such as teeth, for opening traditional mechanical locks.

The controller may be arranged to use the memory as temporary storage for a list of access rights from the access control device bound for one or more lock devices.

The list of access rights may comprise a revocation list, indicating key devices which are to be barred from gaining access.

The controller may be arranged to use the memory as temporary storage for an audit trail from one or more lock devices bound for the access control device.

The controller may be arranged to receive an updated time for the clock of the key device.

The controller may be arranged to send a challenge code to the access control device; receive a response code along with the updated time, the response code being based on the challenge code; and determine the updated time to be valid when the response code is determined to be valid.

The controller may be arranged to determine the response code to be valid when the response code comprises a correct cryptographic processing result based on the challenge code and the updated time.

The controller may be arranged to determine the response code to be valid when the response code comprises a correct cryptographic processing result based on the challenge code and when the response code is received within a threshold time from when the challenge code is sent.

The controller may be arranged to perform any one or more of the following communication with the access control device: receiving updated access rights specifically for the key device, receiving an updated validity time for the key device, and sending an audit trail for the key device. The clock of the key device provides the ability to include functionality such as a validity time, which provides a passive access restriction, since the validity time will eventually expire.

The controller may be arranged to communicate with the access control device to obtain authorisation for the key device to be granted access by a lock device when the connector of the key device is connected with a connector of the lock device.

The controller may be arranged to only perform the communication with the access control device when a trigger condition has been determined to be true in the key device.

The trigger condition may be true when the connector of the key device is connected with a connector of a lock device.

The trigger condition may be true when a timer of the key device expires.

The key device may further comprise a user input device, and the trigger condition may be true when the user input device is actuated.

The key device may further comprise a code input device.

The controller may be arranged to require a correct code to be entered using the code input device for the key device to send a signal to request access, when the radio communication module is offline from the access control device.

The controller may be arranged to extend a validity time of the key device when a correct code has been entered using the code input device.

The radio communication module may be a short range communication module for communication with the access control device via an intermediary access control communication device.

The radio communication module may be a cellular network communication module for communication with via a cellular network.

According to a second aspect, it is presented a method, performed in a key device. The key device comprises a mechanical interface for mechanically maneuvering a lock device upon successful access control, the mechanical interface comprising a connector for powering the lock device and for communication with the lock device; a clock; a memory; a radio communication module; and a controller. The method comprises the steps of: communicating online, using the radio communication module with an access control device; and using the memory as temporary storage for offline communication between the access control device and one or more lock devices.

The step of using the memory as temporary storage may comprise using the memory as temporary storage for an updated list of access rights from the access control device bound for one or more lock devices.

The list of access rights may comprise a revocation list, indicating key devices which are to be barred from gaining access.

The step of using the memory as temporary storage may comprise using the to memory as temporary storage for an audit trail from one or more lock devices bound for the access control device.

The step of communicating with the access control device may comprise receiving an updated time for the clock of the key device.

The step of communicating with the access control device may comprise: sending a challenge code to the access control device; receiving a response code along with the updated time, the response code being based on the challenge code; and determining the updated time to be valid when the response code is determined to be valid.

The step of determining the updated time to be valid may comprise determining the response code to be valid when the response code comprises a correct cryptographic processing result based on the challenge code and the updated time.

The step of determining the updated time to be valid may comprise determining the response code to be valid when the response code comprises a correct cryptographic processing result based on the challenge code and when the response code is received within a threshold time from when the challenge code is sent.

The step of communicating with the access control device may comprise any one or more of the following substeps: receiving updated access rights specifically for the key device, receiving an updated validity time for the key device, and sending an audit trail for the key device.

The method may further comprise the step of: determining whether a trigger condition is true; and wherein the step of communicating with the access control device only occurs when the trigger condition has been determined to be true.

The method may further comprise the steps of: receiving, using a code input to device, a code entered by a user when the radio communication module is offline from the access control device; and communicating with the lock device to request access only when the code is determined to be is correct.

The method may further comprise the step of: extending a validity time of the key device when the code is determined to be correct.

According to a third aspect, it is presented a computer program comprising computer program code which, when run on a key device comprising a mechanical interface for mechanically maneuvering a lock device upon successful access control, the mechanical interface comprising a connector for powering the lock device and for communication with the lock device; a clock; a memory; a radio communication module; and a controller, causes the key device to communicate online, using the radio communication module with an access control device; and use the memory as temporary storage for offline communication between the access control device and one or more lock devices.

According to a fourth aspect, it is presented a computer program product comprising a computer program according to the third aspect and a computer readable means on which the computer program is stored.

It is to be noted that any feature of the first, second, third and fourth aspects may be applied, where appropriate, to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
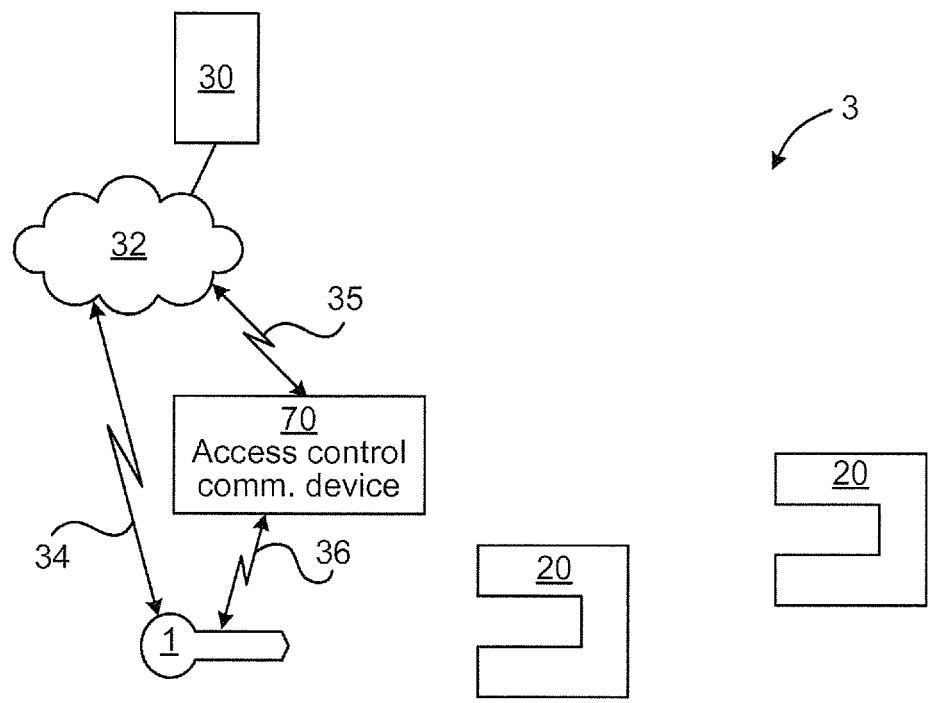
FIG. 1 is a schematic diagram illustrating an access control system in which embodiments presented herein can be applied.

FIG. 1 is a schematic diagram illustrating an access control system 3 in which embodiments presented herein can be applied. There are a number of lock devices 20. The lock devices 20 perform access controls of key devices 1 presented to it, e.g. by inserting a key device 1 in question in the lock device 20, whereby the lock device 20 is powered by the key device 1. Also, there is communication between the key device 1 and the lock device 20 whereby the lock device performs electronic access control of the key device 1, as explained in more detail below. When access is granted, the lock device 20 is set to an openable state, whereby a user can e.g. open a door which is access controlled by the lock device 20.

The key device 1 is equipped with a radio communication module, whereby it can communicate using online communication with an access control device 30 of the access control system 3. Online communication is to be interpreted as the ability to communicate as needed on demand. Offline communication, on the other hand is to be interpreted as communication where communication is stored by an inter mediate device for further forwarding when the next link to the addressee becomes available. When the radio communication module is adapted for a cellular network 32, the key device communicates with a cellular network 32 via a cellular network link 34 e.g. using any one or a combination of LTE (Long Term Evolution), UMTS (Universal Mobile Telecommunications System) utilising W-CDMA (Wideband Code Division Multiplex), CDMA2000 (Code Division Multiple Access 2000), or any other current or future wireless network, as long as the principles described hereinafter are applicable. When the radio communication module is adapted for a short range radio network (such as Bluetooth, WiFi, etc.), the key device 1 communicates over a short range radio link 36 to an access control communication device 70. The access control communication device 70 communicates via a cellular network link 35 with the cellular network 32. In this way, the access control communication device 70 acts as a gateway, providing access to the access control device 30 for the key device 1.

The access control device 30 acts as a controller in the access control system 3 and may e.g. be implemented using one or more computers, e.g. a server and an operator terminal. An operator can thereby control access control rights and monitor other security aspects of the access control system using the access control device 30.

The connection between the key device 1 and the access control device 30 can be used for several purposes. For example the key devices 1 can be used for providing data from the access control device to the lock devices 20. To make this happen, the key devices 1 connect to the access control device 30 on occasion to download such data. When each one of these key devices 1 is later inserted in a lock device 20, the data bound for the lock device 20 is transferred to the lock device 20.

One example will now be presented related to access rights. The key device 1, on occasion, downloads, using online communication with the access control device 30, access rights that are later provided to the lock devices 20 when the key device 1 is inserted. The access rights are stored in a memory of the key device 1, thus providing an offline (also known as asynchronous) communication to (or from) the lock devices 20. These access rights can include a revocation list, indicating key devices that are to be barred from gaining access. The revocation list is global in the access control system and thus applies to all key devices 1 and all lock devices 20. In this way, any changes to the revocation list are propagated efficiently and indiscriminately throughout the access control system 3 to lock devices even though these do not have a power supply by themselves and can not communicate directly with the access control device 30. Nevertheless, certain items in the access rights may be associated with a particular lock device or a group of lock devices.

If a user in the access control system 3 loses a key device, the operator of the access control device 30 can update the access rights in the access control device such that the revocation list includes the identity of the lost key device. When one or more key devices 1 download the new revocation list, the revocation list is provided to any lock devices 20 in which the key device 1 is inserted. Even the lost key device will in many cases download the new revocation list, whereby on an attempt of a thief to gain access using the lost key device will be denied.

Alternatively or additionally, the access rights can include an access list, to comprising a list of identifiers of key devices which are to gain access. The access rights can be global within the system, for all lock devices, for individual lock devices or for a group of lock devices.

Alternatively or additionally, each key device 1 can, on occasion, receive an updated validity time for the key device 1 in question. Each key device 1 may have access rights which are only valid until a specific time, after which the key device 1 loses its access rights. When the key device t is in contact with the access control device, its validity time can be extended, i.e. revalidation. In this way, the key device 1 loses its access rights after a certain amount of time unless it makes contact with the access control device 30. In one embodiment, updated access rights are downloaded on the same occasion when the validity time of the key device is extended.

The significance of this combination of access rights and validity times will be illustrated in an example now. Let us say that a key device 1 gets stolen. The original owner reports this and the access control device 30 is updated with new access rights, barring the stolen key device from access to lock devices in the access control system 3. The thief does not want these new access rights to be provided to the lock devices and may prevent communication between the key device and the access control device 30 from happening. However, the validity time will eventually expire and the stolen key device 1 is 30 prevented from gaining access in that way. If the thief then somehow knows that the validity time has expired and allows the key device t to communicate with the access control device 30, the validity time may be extended, but the key device 1 will also download the updated access rights, whereby the stolen key device 1 is barred from access in that way. Optionally, the access control device 30 will not even grant an extended validity time since the stolen key device could be flagged as barred (or stolen).

Alternatively or additionally, each key device 1 can, on occasion, receive an updated time for the clock of the key device. This ensures that the clock of the key device is accurate, which ensures the validity times are applied accurately.

The communication between the key devices 1 and the access control device 30 can also be used in the other direction, towards the access control device. The mechanism is the same, where communication occurs upon insertion of a key device 1 in a lock device 20. But here, data is transmitted from the lock device 20 to the key device 1. When the key device 1 makes contact with the access control device 30, the data is uploaded to the access control device 30.

In this way, the key device 1 uses its memory as temporary storage for data from the lock devices 20 to the access control device 30. For example, an audit trail from the lock devices 20 can be uploaded to the access control device 30 in this way. The audit trail to the access control device includes data about successful and/or failed attempts of gaining access to the lock device in question.

Also, an audit trail from the key device 1 can be uploaded to the access control device 30, indicating successful and/or failed attempts of the key device in question gaining access to the lock devices.

Optionally, the key device 1 communicates with the access control device 30 to obtain authorisation for the key device 1 to be granted access by a lock device 20 in real time, when the key device 1 is inserted in the lock device 20. In this way, the access control device 30 is in full control of what key device 1 is allowed to gain access using what lock device 20.

As is explained in more detail below, various trigger conditions can be used to initiate the communication between the key devices 1 and the access control device 30.

Figure 2:
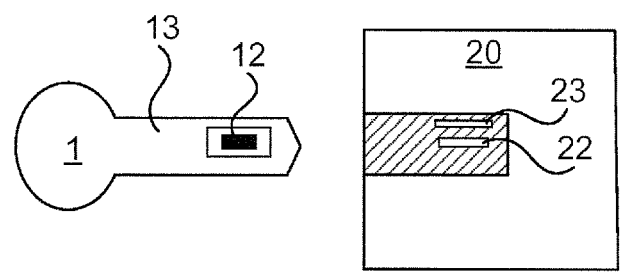
FIG. 2 is a schematic diagram more closely illustrating a key device and a lock device from FIG. 1.

FIG. 2 is a schematic diagram more closely illustrating a key device and a lock device from FIG. 1.

The key device 1 comprises a connector 12 and a mechanical interface 13 (such as a blade), which are electrically insulated from each other. The lock device 20 comprises a socket with a first connector 22 and a second connector 23. The first connector 22 is positioned such that, when the key to device 1 is inserted in the socket, the first connector 22 makes contact with the connector 12 of the key device. The connection can be galvanic, or alternatively an inductive connection. In the case of an inductive connection, the connectors do not need to physically connect. Analogously, the second connector 23 is positioned such that, when the key device 1 is inserted in the socket, the second connector 23 makes galvanic (or inductive) contact with the mechanical interface 13 of the key device 1. This arrangement provides a dual terminal connection between the key device 1 and the lock device 20 when the key device 1 is inserted in the socket of the lock device 20. The dual terminal connection is used both for communication between the key device 1 and the lock device and for powering the lock device by transferring electric power from a power supply of the key device 1 to the lock device 20. Alternatively, separate connectors (not shown) can be provided for powering the lock device 20 and communication between the key device 1 and the lock device 20.

Figure 3:
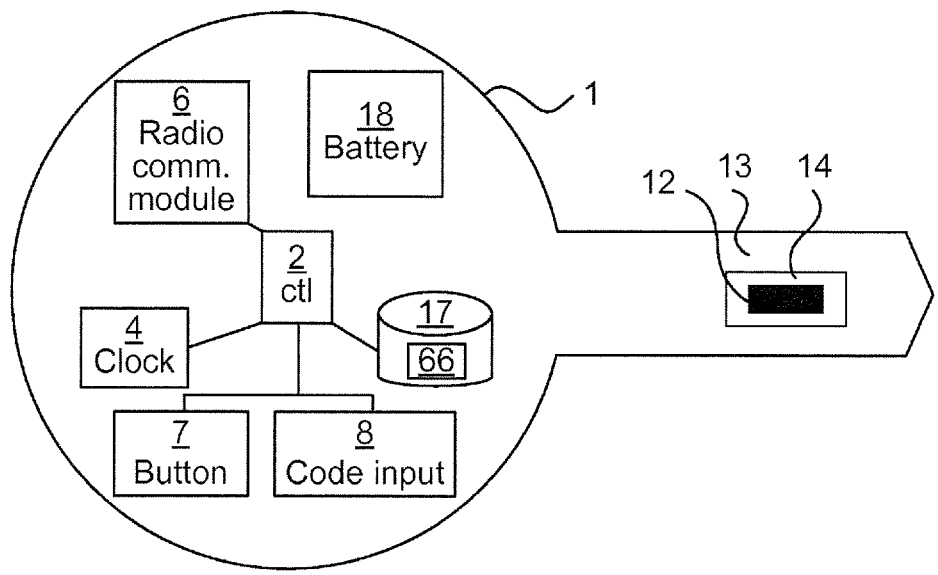
FIG. 3 is a schematic diagram illustrating some components of the key device of FIGS. 1 and 2.

FIG. 3 is a schematic diagram illustrating some components of the key device of FIGS. 1 and 2. A processor, also known as a controller, 2 is provided using any combination of one or more of a suitable central processing unit (CPU), multiprocessor, microcontroller, digital signal processor (DSP), application specific integrated circuit etc., capable of executing software instructions 66 stored in a memory 17, which can thus be a computer program product. The processor 2 can be arranged to execute software instructions stored in the memory 78 to perform any one of the methods described with reference to FIG. 5 below.

The memory 17 can be any combination of read and write memory (RAM) and read only memory (ROM). The memory 17 also comprises persistent storage, which, for example, can be any single one or combination of solid state memory, magnetic memory, or optical memory. Optionally, part or all of the memory 17 is part of a Subscriber Identity Module (SIM), thereby implementing secure storage and application execution environment, and can provide credentials which can be used by the radio communication to module 6.

Optionally, the processor 2 and the memory 17 can be provided in a single microcontroller unit (MCU).

The key device 1 also comprises a radio communication module 6. The radio communication module 6 comprises one or more transceivers, comprising analogue and digital components, and a suitable number of antennas. The radio communication module can either be provided for communication with a cellular network or for communication over short range radio (such as Bluetooth, WiFi, etc.). Using the radio communication module 6, the key device 1 can communicate with an access control device as explained above.

A clock 4 is provided as part of the key device 1 and is used to enforce the validity times described above.

A battery 18 is provided to power all electrical components of the key device and also to power lock devices as explained above. The battery 18 can be a rechargeable battery or an exchangeable disposable battery.

The key device 1 is optionally provided with user input element, such as a push button 7 or similar, which can e.g. be used by a user to start communication with the access control device.

Optionally, a code input device 8 is provided as part of the key device 1. The code input device 8 can e.g. be used to allow the user to extend the validity time of the key device 1 when access to the access control device is not available e.g. due to current radio conditions/radio isolation.

Other components of the key device 1 are omitted in order not to obscure the concepts presented herein.

The key device 1 comprises a mechanical interface 13 for mechanically maneuvering a lock device 20 upon successful access control. The connector 12 is provided with electrical insulation 14 from the mechanical interface, to allow two separate galvanic contact terminals connect with a lock device.

Figure 4:
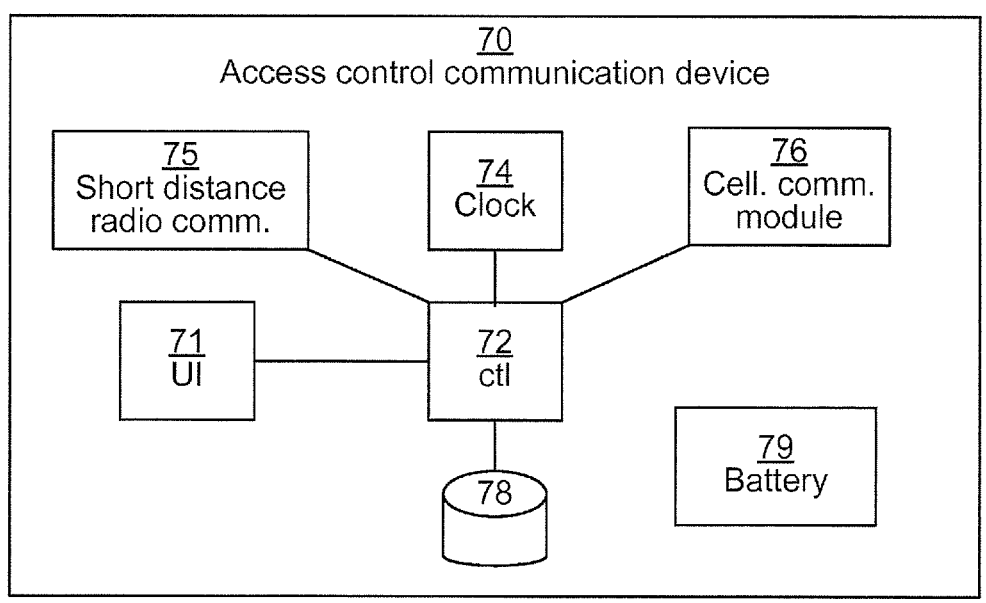
FIG. 4 is a schematic diagram illustrating an access control communication device of FIG. 1.

FIG. 4 is a schematic diagram illustrating some components of the access to control communication device 70 of FIG. 1. A processor 72 is provided using any combination of one or more of a suitable central processing unit (CPU), multiprocessor, microcontroller, digital signal processor (DSP), application specific integrated circuit etc., capable of executing software instructions stored in a memory 78, which can thus be a computer program product.

The memory 78 can be any combination of read and write memory (RAM) and read only memory (ROM). The memory 78 also comprises persistent storage, which, for example, can be any single one or combination of solid state memory, magnetic memory, or optical memory. Optionally, part or all of the memory 78 is included in a Subscriber Identity Module (SIM), thereby implementing secure storage and application execution environment, and can provide credentials which can be used by a cellular communication module 76.

The cellular communication module 76 comprises one or more transceivers, comprising analogue and digital components, and a suitable number of antennas. The cellular communication module 76 is provided for communication with a cellular network.

A short distance radio communication module 75 is provided for communication over short range radio (such as Bluetooth, WiFi, etc.), e.g. with the key device 1 as explained above.

A clock 74 is provided and a battery 79 is provided to power all electrical components of the access control communication device 70. The battery 79 can be a rechargeable battery or an exchangeable disposable battery.

A user interface 71 is provided to allow a user to input data and to receive output of data. For example, the user interface 71 can comprise one or more of a display, which is optionally touch sensitive, a keypad, a microphone, a speaker, etc.

Other components of the access control communication device 70 are omitted in order not to obscure the concepts presented herein.

In one embodiment, the access control communication device 70 is a mobile phone.

Figure 5:
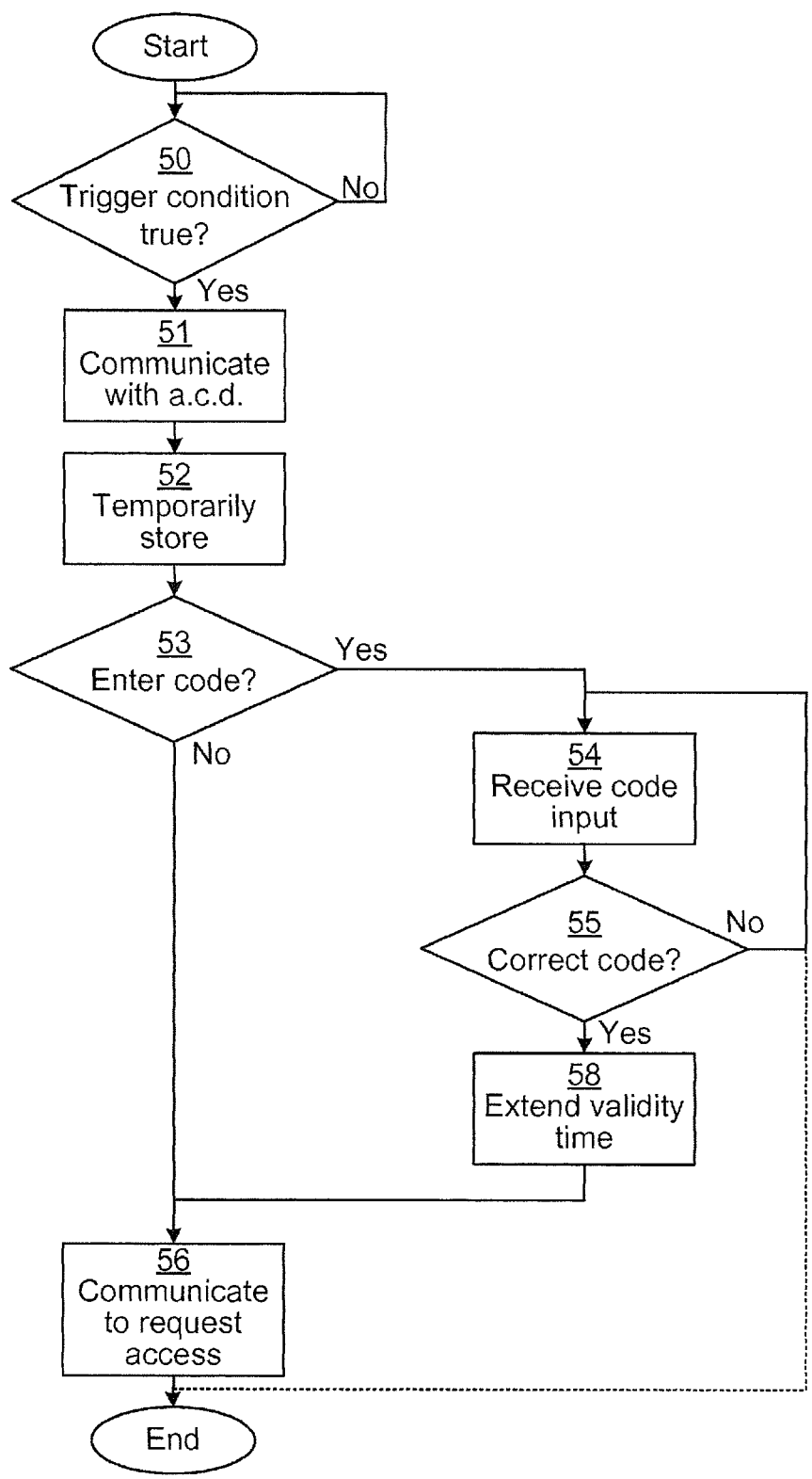
FIG. 5 is a schematic diagram illustrating a method performed in the key device of FIGS. 1, 2 and 3.

FIG. 5 is a schematic diagram illustrating a method performed in the key device 1 of FIGS. 1, 2 and 3. The method can e.g. be implemented in the key device 1 using software instructions stored in the memory 78 which, when executed by the processor (controller) 2 causes the processor to perform any embodiment of the method described below.

In an initial trigger condition true step 50, it is determined whether a trigger condition is true. If this is the case, the method continues to a communicate with access control device step 51. Otherwise, the method repeats the conditional trigger condition step 50, optionally after an idle period.

The trigger condition can e.g. be that the connector of the key device is connected with the connector of a lock device. Alternatively or additionally, the trigger condition can be that a timer of the key device expires. Alternatively or additionally, the trigger condition can be that a user input element (7 of FIG. 3) of the key device is actuated.

In the communicate with access control device step 51, the key device communicates using online communication with the access control device when possible, as described with reference to FIG. 1 above, e.g. to update access rights and/or to provide audit logs. If the key device is unable to communicate with the access control device, the key device is considered to be off-line. The communication can, for instance, occur using Internet Protocol (IP) over the cellular network link.

This step can e.g. comprise receiving an updated time for the clock of the key device. In this way, it is ensured that the clock of the key device is correct. The clock can e.g. be used to limit a validity time of the key, e.g. as explained above where the key device 1 loses its access rights after a specific time. Also, a clock with a valid time can be used for schedules, where access rights may be valid only during certain hours and/or day(s) of the week.

In the optional conditional enter code step 53, it is determined whether a code needs to be entered. This can e.g. be due to the key device being off-line and a code needs to be entered to extend the validity time. In one embodiment, it is required to enter a code every so often to extend the validity time. This could be every time the validity time is extended or less often than that. This prevents someone not knowing the code from gaining access using a lost key device, even if the revocation list has not been updated yet. In one embodiment, it is required to enter a code every time access to a lock device is needed, regardless if the key device is offline or online. If a code needs to be entered, the method continues to a receive code input step 54. Otherwise, the method continues to a communicate to request access step 56.

In the optional receive code input step 54, a code is received from the user of the key device using the code input device of the key device.

In an optional conditional correct code step 55, it is evaluated whether the code which was input by the user is correct or not. If this is the case, the method continues to an extend validity time step 58. Otherwise, the method either returns to the receive code input step 54 or the method ends, if too many unsuccessful attempts of code input have been detected.

In the optional extend validity time step 58, the validity time of the key device 1 is extended, as explained above.

It is to be noted that, as explained above, the validity time can be extended also without the user entering a code.

In the optional communicate to request access step 56, the key device communicates with the lock device to request access. In some situations, this step may not need to be performed, e.g. when the key device only communicates with the access control device autonomously or due to a user input to the key device. When this step is performed, the lock device can generate a random (or pseudo-random) number and send the number to the key device. The key device and lock device independently pass the number through a one-way function together with a secret key, generating a response. The key device sends the response to the lock device which compares the response received from the key device with the response generated by the lock device. When the responses match, the lock device grants access. This process is known as a type of challenge response process. Other suitable methods for authentication can equally well be used.

Optionally, the method is repeated to handle more communication with the key device and the access control device.

Figure 6:
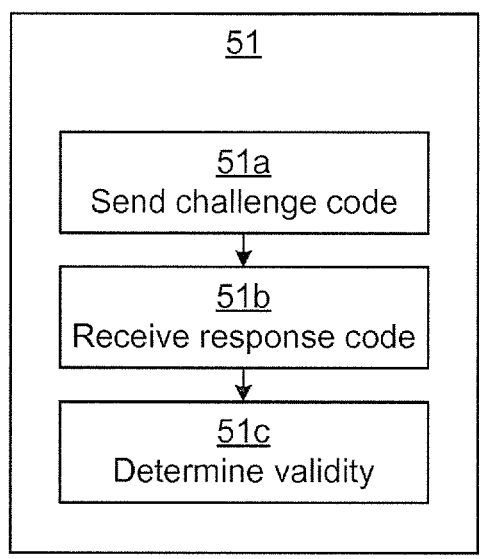
FIG. 6 is a schematic diagram illustrating an embodiment of the communication with the server of FIG. 5.

FIG. 6 is a schematic diagram illustrating an embodiment of the communicate with the access control device step 51 of FIG. 5.

In a send challenge code step 51*a*, a challenge code is sent to the access control device. The challenge code can e.g. be a random number or any other suitable string or number. The challenge code differs each time this step is executed.

In a receive response code step 51*b*, a response code is received along with the updated time. For instance, the updated time and the response code can be included in a single message. The response code is generated by the access control device based on the challenge code and the updated time. For instance, the response code can be digital signature of the challenge code concatenated with the updated time, using the digital signature of the access control device. Alternatively or additionally, the response code can be an encryption of the challenge code and the updated time.

In a determine validity step 51*c*, the updated time is determined to be valid when the response code is determined to be valid, e.g. when the response code comprises a correct electronic signature based on the challenge code and the updated time, and when the challenge code is received within a threshold time from when the challenge code is sent. In this way, a man-in-the-middle is unable to delay the response with the updated time to thereby affect the validity of the key device.

Here now follows a list of embodiments from another perspective, enumerated with roman numerals.

i. A key device comprising:
a blade for mechanically manoeuvring a lock device upon successful access control, the blade comprising a connector for powering the lock device and for communication with the lock device such that the lock device is able to perform electronic access control using the key device;
a clock;
a memory;
a radio communication module; and
a controller arranged to, using the radio communication module communicate with an access control device and use the memory as temporary storage for asynchronous communication between the access control device and one or more lock devices.

ii. The key device according to embodiment i, wherein the controller is arranged to use the memory as temporary storage for a list of access rights from the access control device bound for one or more lock devices.

iii. The key device according to embodiment ii, wherein the list of access rights comprises a revocation list, indicating key devices which are to be barred from gaining access.

iv. The key device according to any one of the preceding embodiments, wherein the controller is arranged to use the memory as temporary storage for an audit trail from one or more lock devices bound for the access control device.

v. The key device according to any one of the preceding embodiments, wherein the controller is arranged to perform any one or more of the following communication with the access control device: receiving updated access rights specifically for the key device, receiving an updated validity time for the key device, receiving an updated time for the clock of the key device, and sending an audit trail for the key device.

vi. The key device according to any one of the preceding embodiments, wherein the controller is arranged to communicate with the access control device to obtain authorisation for the key device to be granted access by a lock device when the connector of the key device is connected with a connector of the lock device.

vii. The key device according to any one of the preceding embodiments, wherein the controller is arranged to only perform the communication with the access control device when a trigger condition has been determined to be true in the key device.

viii. The key device according to embodiment vii, wherein the key device further comprises a user input device, and the trigger condition is true when the user input device is actuated.

ix. The key device according to any one of the preceding embodiments, further comprising a code input device.

x. The key device according to embodiment ix, wherein the controller is arranged to require a correct code to be entered using the code input device for the key device to send a signal to request access, when the radio communication module is offline from the access control device.

xi. The key device according to embodiment x, wherein the controller is arranged to extend a validity time of the key device when a correct code has been entered using the code input device.

xii. The key device according to any one of the preceding embodiments, wherein the radio communication module is a short range communication module for communication with the access control device via an intermediary access control communication device.

xiii. The key device according to any one of embodiments i to xi, wherein the radio communication module is a cellular network communication module to for communication with via a cellular network.

xiv. A method, performed in a key device, the key device comprising a blade for mechanically manoeuvring a lock device upon successful access control, the blade comprising a connector for powering the lock device and for communication with the lock device; and a clock, the method comprising the steps of:
communicating, using a radio communication module of the key device with an access control device; and
using a memory of the key device as temporary storage for asynchronous communication between the access control device and one or more lock devices.

xv. The method according to embodiment xiv, wherein the step of using the memory as temporary storage comprises using the memory as temporary storage for an updated list of access rights from the access control device bound for one or more lock devices.

xvi. The method according to embodiment xv, wherein the list of access rights comprises a revocation list, indicating key devices which are to be barred from gaining access.

xvii. The method according to any one of embodiments xiv to xvi, wherein the step of using the memory as temporary storage comprises using the memory as temporary storage for an audit trail from one or more lock devices bound for the access control device.

xviii. The method according to any one of the preceding embodiments, wherein the step of communicating with the access control device comprises any one or more of the following substeps: receiving updated access rights specifically for the key device, receiving an updated validity time for the key device, receiving an updated time for the clock of the key device, and sending an audit trail for the key device.

xix. The method according to any one of embodiments xiv to xviii, further to comprising the step of:
determining whether a trigger condition is true;
and wherein the step of communicating with the access control device only occurs when the trigger condition has been determined to be true.

xx. The method according to any one of embodiments xiv to xix, further comprising the steps of:
receiving, using a code input device, a code entered by a user when the radio communication module is offline from the access control device; and
communicating with the lock device to request access only when the code is determined to be is correct.

xxi. The method according to embodiment xviii, further comprising the step of:
extending a validity time of the key device when the code is determined to be correct.

xxii. A computer program comprising computer program code which, when run on a key device comprising a blade for mechanically manoeuvring a lock device upon successful access control, the blade comprising a connector for powering the lock device and for communication with the lock device; and a clock; causes the key device to:
communicate, using a radio communication module of the key device, with an access control device; and
use a memory of the key device as temporary storage for asynchronous communication between the access control device and one or more lock devices.

xxiii. A computer program product comprising a computer program according to embodiment xxii and a computer readable means on which the computer program is stored.

The invention has mainly been described above with reference to a few embodiments. However, as is readily appreciated by a person skilled in the art, other embodiments than the ones disclosed above are equally possible to within the scope of the invention, as defined by the appended patent claims.

What is claimed is:

1. A key device comprising:
   a mechanical interface for mechanically maneuvering a lock device upon successful access control, the mechanical interface comprising a connector for communication with the lock device such that the lock device is able to perform electronic access control using the key device;
   a clock;
   a memory;
   a radio communication module; and
   a controller arranged to, using the radio communication module communicate with an access control device and use the memory as temporary storage for communication.

2. The key device according to claim 1, wherein the controller is arranged to use the memory as temporary storage for a list of access rights from the access control device bound for one or more lock devices.

3. The key device according to claim 2, wherein the list of access rights comprises a revocation list, indicating key devices which are to be barred from gaining access.

4. The key device according to claim 1, wherein the controller is arranged to use the memory as temporary storage for an audit trail from one or more lock devices bound for the access control device.

5. The key device according to claim 1, wherein the controller is arranged to receive an updated time for the clock of the key device.

6. The key device according to claim 5, wherein the controller is arranged to send a challenge code to the access control device; receive a response code along with the updated time, the response code being based on the challenge code; and determine the updated time to be valid when the response code is determined to be valid.

7. The key device according to claim 6, wherein the controller is arranged to determine the response code to be valid when the response code comprises a correct cryptographic processing result based on the challenge code and the updated time.

8. The key device according to claim 6, wherein the controller is arranged to determine the response code to be valid when the response code comprises a correct cryptographic processing result based on the challenge code and when the response code is received within a threshold time from when the challenge code is sent.

9. The key device according to claim 1, wherein the controller is arranged to perform any one or more of the following communication with the access control device: receiving updated access rights specifically for the key device, receiving an updated validity time for the key device, and sending an audit trail for the key device.

10. The key device according to claim 9, wherein the controller is arranged to communicate with the access control device to obtain authorization for the key device to be granted access by a lock device when the connector of the key device is connected with a connector of the lock device.

11. The key device according to claim 1, wherein the controller is arranged to only perform the communication with the access control device when a trigger condition has been determined to be true in the key device.

12. The key device according to claim 11, wherein the key device further comprises a user input device, and the trigger condition is true when the user input device is actuated.

13. The key device according to claim 1, further comprising a code input device.

14. The key device according to claim 13, wherein the controller is arranged to require a correct code to be entered using the code input device for the key device to send a signal to request access, when the radio communication module is offline from the access control device.

15. The key device according to claim 14, wherein the controller is arranged to extend a validity time of the key device when a correct code has been entered using the code input device.

16. The key device according to claim 1, wherein the radio communication module is a short range communication module for communication with the access control device via an intermediary access control communication device.

17. The key device according to claim 1, wherein the radio communication module is a cellular network communication module for communication with via a cellular network.

18. A method, performed in a key device, the key device comprising a mechanical interface for mechanically maneuvering a lock device upon successful access control, the mechanical interface comprising a connector for communication with the lock device; and a clock, the method comprising the steps of:
    communicating online, using a radio communication module of the key device with an access control device; and
    using a memory of the key device as temporary storage for communication.

19. The method according to claim 18, wherein the step of using the memory as temporary storage comprises using the memory as temporary storage for an updated list of access rights from the access control device bound for one or more lock devices.

20. The method according to claim 19, wherein the list of access rights comprises a revocation list, indicating key devices which are to be barred from gaining access.

21. The method according to claim 18, wherein the step of using the memory as temporary storage comprises using the memory as temporary storage for an audit trail from one or more lock devices bound for the access control device.

22. The method according to claim 18, wherein the step of communicating with the access control device comprises receiving an updated time for the clock of the key device.

23. The method according to claim 22, wherein the step of communicating with the access control device comprises:
    sending a challenge code to the access control device;
    receiving a response code along with the updated time, the response code being based on the challenge code; and
    determining the updated time to be valid when the response code is determined to be valid.

24. The method according to claim 18, wherein the step of determining the updated time to be valid comprises determining the response code to be valid when the response code comprises a correct cryptographic processing result based on the challenge code and the updated time.

25. The method according to claim 24, wherein the step of determining the updated time to be valid comprises determining the response code to be valid when the response code comprises a correct cryptographic processing result based on the challenge code and when the response code is received within a threshold time from when the challenge code is sent.

26. The method according to claim 18, wherein the step of communicating with the access control device comprises any one or more of the following substeps: receiving updated access rights specifically for the key device, receiving an updated validity time for the key device, and sending an audit trail for the key device.

27. The method according to claim 18, further comprising the step of:
   determining whether a trigger condition is true;
   and wherein the step of communicating with the access control device only occurs when the trigger condition has been determined to be true.

28. The method according to claim 18, further comprising the steps of:
   receiving, using a code input device, a code entered by a user when the radio communication module is offline from the access control device; and
   communicating with the lock device to request access only when the code is determined to be is correct.

29. The method according to claim 28, further comprising the step of:
   extending a validity time of the key device when the code is determined to be correct.

30. A computer program comprising computer program code which, when run on a key device comprising a mechanical interface for mechanically maneuvering a lock device upon successful access control, the mechanical interface comprising a connector for communication with the lock device; and a clock, causes the key device to:
   communicate online, using a radio communication module of the key device, with an access control device; and
   use a memory of the key device as temporary storage for communication between the access control device and one or more lock devices.

31. A computer program product comprising a computer program according to claim 30 and a computer readable means on which the computer program is stored.

* * * * *